United States Patent Office 2,884,949
Patented May 5, 1959

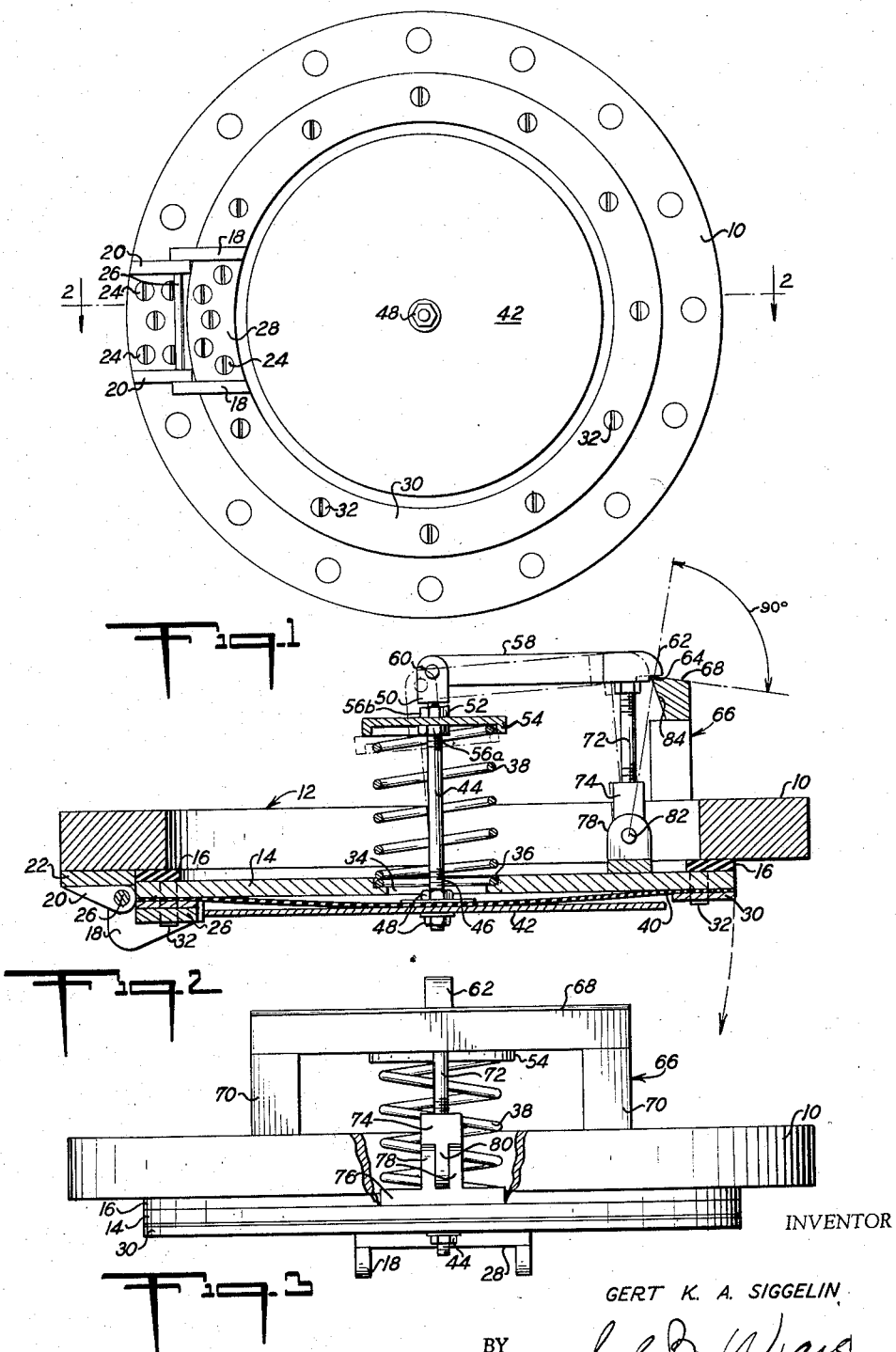

2,884,949

PRESSURE RELIEF VALVE

Gert K. A. Siggelin, Alexandria, Va., assignor to Desomatic Products, Inc., Falls Church, Va., a corporation of Delaware Application June 19, 1956, Serial No. 592,372

3 Claims. (Cl. 137—467)

This invention relates to a pressure relief valve. It is particularly useful for vacuum relief and in most usual service is designed for mounting in gas systems such as in air plenums and gas ducts to provide instantaneous relief at critical pressure differentials.

The valve may be set to open whereby instantaneous relief becomes available at some selected but adjustable differential pressure such as usually from 10 to 25 inches of water under negative pressure, but the valve may be satisfactorily used at substantially higher or lower pressure differentials if desired.

The valve comprises a pressure releasable port closure conveniently mounted on a port enclosing casing or in a gas container or duct wall across which a pressure differential may exist. The port closure is latched in closed position to support a pressure resilient diaphragm which at some preadjusted pressure differential will trip the latch of a latching mechanism whereby, the valve closure may open widely for quick pressure release as a safety valve. The valve closure is reset to closed and latched position manually at will. The valve also carries means for adjusting the relationship between the diaphragm movement and latch whereby the latching mechanism will be released and the valve port opened at any desired preset pressure differential.

The construction will best be understood by reference to the drawings in which:

Fig. 1 is a bottom view of the valve in plan,

Fig. 2 is an elevational section taken through the center of the valve on the line 2—2, of Fig. 1, Fig. 3 is an end view of the Fig. 2 position of the valve with a part of the casing broken away and in section to show details of the latching mechanism.

As shown in the drawings, the valve comprises a casing 10 which may be of any shape, but as shown here is an annular ring which concentrically encircles an open portion comprising a valve port indicated by the arrow 12. A valve closure disc-like plate 14 is hingedly mounted on the lower side of the casing ring 10 to close the port 12 through a resilient gasket 16 which is disposed on the same side of the closure ring between the closure plate 14 and the ring 10 for gas-tight seal thereof.

The closure plate 14 is pivotally supported to the casing ring 10 by a bracket plate 28 having bracket arms 18 which cooperate with similar bracket plate 22 having bracket arms 20 as raised earlike members integral with or attached to the bracket plate 22. The plate 28 is fastened to a ring 30 and the plate 22 is fastened to the casing 10 by bolts 24. The bracket arms 18 and 20 are pivotally secured together by a pivot pin 26 whereby the bracket arms 18 and 20 and pivot pin 26, securing them together, comprise a hinge. The lower annular ring 30 is bolted to the closure plate 15 by bolts 32. Thus, the closure plate 14 in closed position bears against the annular resilient gasket 16 for sealing the circular port 12; or as hingedly mounted to the casing ring 10, may swing entirely open for communication of gases through the port 12 about the hinge pivot pin 26.

The closure plate 14 is bored at the center with an opening 34 which allows communication through both sides of the plate, and the annular wall about that opening is cut with a ledge 36 upon which a compression spring 38 is vertically supported. The opening 34 allows communication of the upper side of the valve port with a pressure responsive resilient diaphragm 40. That diaphragm which may be of rubber or plastic, shown exaggeratedly deformed for more complete understanding of the operation of the construction, is mounted adjacent to the lower surface of plate 14 and comprises a disc of the same diameter as plate 14. The diaphragm 40 is secured to the bottom surface of plate 14 by ring 30 tightly fastened thereto at the peripheral edges by bolts 32.

The underside of the diaphragm 40 is supported and reinforced by an annular disc-like plate 42, which is supported through its center in an adjusted vertical position on a spindle arm 44. The spindle arm 44 is mounted vertically in the center of the port opening 12 and comprises a rod having the lower end threaded at 46, upon which two securing nuts 48 are threaded, securing between them, for vertical support, both the diaphragm 40 and the reinforcing plate 42.

The upper vertical end of the spindle 44 is threaded into a base portion having two upwardly extending parallel ears defining a yoke 50. A spring seat comprising a flat disk 52 with down turned flanges 54 and centrally bored, is mounted on the spindle 44 near its upper end and is secured thereto by nuts 56a and 56b which set the spring seat 52 at an adjusted vertical position on the spindle 44 with respect to the compression of spring 38. With that construction the spring 38 seated at its lower end upon the ledge 36 is confined in adjusted compression within the flanged disc 52 whereby the spindle arm 44 carrying the plate 42 and diaphragm 40 are held vertically positioned to be contiguous to the lower surface of the plate 14. The compression spring 38 with adjusted resilience bears against the upper spring seat 52, and thereby holds the spindle 44 in vertical position.

A horizontally mounted latch arm 58 has one inner end bores and pivotally secured within the yoke 50 by a pivot pin 60. The opposite outer end of the latch arm 58 is rounded at 62 and notched in its lower outer end edge at 64 for releasable support of the outer end upon a raised abutment 66. Thus the latch arm 58 is horizontally mounted with its inner end pivotally secured to yoke 50 in the spindle 44 and its outer end supported upon the abutment 66. That abutment 66 comprises an elongated horizontally disposed abutment bar 68 vertically supported at each end from a pair of legs 70 which are fixed to the upper surface of the casing ring 10, assembled securely thereto as by welding or bolting. The legs 70 are supported from the annular casing ring a sufficient distance apart so that the horizontal abutment bar 68 will be disposed above and within the annular valve port area 12 for cooperation as a support and stop with the notch 64 in the lower end of the latch arm 58, and thus acts as an abutment stop and latching support for the outer end of the latch arm.

Disposed slightly inward from the outer latching end of the latch arm 58 is another spindle rod 72 vertically supporting and depending from the arm 58. The spindle 72 is threaded at both ends, at the upper end for attachment to the arm 58 and at the lower end for threading into a link 74 for accurately adjusting the vertical position of the arm 58 which the spindle supports. The upper surface of the plate 14 has fastened thereto a pivot support 76. The support 76 has fixed in the upper surface thereof, a pair of ears 78 defining a yoke therebetween and the link 74 terminates at its lower end in a single ear 80 which is sized for pivotable fit between the ears 78. Both the ears 78 and 80 are bored to receive a pivot pin 82 whereby the spindle 72 and latch arm 58 are pivotally supported to the upper surface of the plate 14.

The spindle 72 and its pivotal support as well as the latch arm 58 are all positioned for pivotal movement within the annular valve port opening 12.

The upper surface of the abutment bar 68 is cut to a plane having a slight inclination from the horizontal, whereby that plane is at right angles to a line from the inner latching edge of the abutment bar to the center of pivot 82. Moreover, the inner latching edge 84, shown somewhat exaggerated in Fig. 2, is cut inward slightly on an arc having its center at pivot 26 for cooperation with the sliding release of the latch arm 58, which upon release from the abutment support at the notched portion 64 when the latch arm 58 is tripped, allows the rounded surface 62 to slide with a minimum of pivotal and frictional interference against the abutment bar 68.

In the construction described, the compression spring 38 holds the spindle 44 verticallly erect, biased in compression between the ledge 36 and the spring seat 54. The inner end of the latch arm 58 is fixedly supported in a horizontal position by pivot 60. The outer end of the latch arm is vertically positioned by spindle arm support 72 to engage the abutment 68. The diaphragm 40 and plate 42 are vertically positioned between adjustment nuts 48 to a position adjacent to the bottom of plate 14. The parallelogram formed between spindles 44 and 72, the horizontal latch arm 58 and the surface of plate 14 is thereby adjusted to maintain the plate 14 sealed upon the valve port 12 merely by support of the latch arm 58 by the abutment 68. However, that entire parallelogram, spindles 44 and 72 and latch arm 58, may be angularly biased by pivotal movement of both spindle arms 72 and 44 at their pivots 60 and 82 at an angle inclined to the vertical, i.e., moving to the left of center, there being sufficient clearance and thereby resilience in the plate 42 and diaphragm 40 to allow the spindle arm 44 to be resiliently displaced from the vertical for engaging and disengaging of the outer end of the latch arm 58 upon the abutment 68. The adjusting nuts 56a and 56b may position the diaphragm and plate 42 only snugly against the bottom of plate 14, but, when desired, sufficient to increase the tension upon rod 44 and lower the inner end of the latch arm 58 slightly below horizontal so that it will take only little additional downward movement of the spindle 44 against the compression of spring 38 to trip the latch arm 58 off of the abutment 68, so that slight pressure upon the diaphragm 40 will trip the latch 58 and cause opening of the valve. However, by raising the setting of nuts 56 a greater movement of the diaphragm 40 under pressure, may be required to effect tripping of the latch 58. Thus, by adjustment of the nuts 56, the diaphragm and plate 42 may be positioned to cause tripping of the latch arm at any adjusted position or, what amounts to the same thing, in any preselected pressure differential on both sides of the valve port.

As thus described, the diaphragm 40 by pressure differential developing thereagainst between both surfaces of the valve casing ring 10, through the port 12 communicated through the opening 34 in the closure plate 14 will allow the diaphragm and its support plate 42 to move downward when the pressure differential exceeds the force necessary to further compress the spring 38. The upper end of the spindle 44 pivoted at 60 and the lower end of the spindle 72 pivoted at 82 allows the pivoted parallelogram frame defined between spindles 44 and 72 as vertical members and latch arms 58 and the surface of plate 14 as horizontal members, by pivotal movement to be deformed from rectangular configuration. That is, by that pivoting movement the latch arm 58 may be moved downward by the lowering and angular movement of the pivot position 60.

With the lowering of the spindle shaft 44, as the diaphragm 40 moves downward with pressure differential thereon, the pivot arm 58 becomes inclined to the horizontal, the notched portion thereof 64 bearing angularly on the abutment 68 while maintaining the plate 14 attached through spindle 72 still in closed position as held by abutment 68. The spindle arm 72 however, rigidly connected at its upper end to the arm 58 and at right angles thereto, having its lower end fixed in pivot 82, forces the notched portion 64 to begin to move downward from its securement upon the abutment 68, so that after a few degrees of angular deflection of arm 58 from its horizontal position, the notched portion 64 will clear the abutment 68 and the entire valve plate 14 and the latching mechanism assembly therewith will swing downward upon pivot 26 entirely opening the valve port 12. That tripping movement of the latching assembly is illustrated in the dotted line portion of Fig. 2.

I claim:

1. A pressure relief valve comprising a body having a port therein allowing gas communication to opposite sides of said valve body, a closure hingedly mounted to one side of said valve body and having a seating face for seating upon said valve port, said closure comprising a disc having a central opening therein and a flexible diaphragm mounted on the side of said disc enclosing said opening opposite to said seating face a raised abutment extending from the opposite side of said valve body, a latch arm horizontally disposed on said opposite side of said valve body set with an outer latching edge slidably supported upon said abutment, a pair of spindle arms mounted on said closure vertically extending through said valve port, one of said spindle arms pivotally secured at its one end to the inner end of said latch arm, the said one spindle arm being concentric with said disc and valve port and extending through said disc opening and secured at its other end to said diaphragm, the other of said spindle arms, comprising an outer spindle arm, pivoted in its lower end in a point near the disc seating surface with its upper end rigidly secured to said latch arm intermediate its ends and disposed near to but inward from said outer latching edge of the latch arm, and a spring mounted in compression between the disc seating surface and the pivot of said one spindle arm, biasing said one spindle arm to vertical position whereby to support said latching arm in horizontal latching position upon said abutment, maintaining said closure seated upon said port and said diaphragm in pressure sensitive communication with the opposite side of said closure.

2. A pressure relief valve comprising a body having a port therein allowing fluid communication to opposite sides of said valve body, a closure having a seating face and pivotally mounted to seat upon one side of said valve port, said closure comprising a disc having a central opening therein and a flexible diaphragm mounted on the side of said disc enclosing said opening opposite to said seating face, a raised abutment extending from the side of said valve body opposite to said seating side of said valve port, a latch arm horizontally disposed on said opposite side of said valve body set with an outer latching edge slidably supported on said abutment, a pair of spindle arms mounted on said seating face side of said closure vertically extending through said valve port in seated position of said closure, one of said spindle arms being pivotally secured at its one end to the inner end of said latch arm, the said one spindle arm being concentric with said disc and valve port and mounted with its other end extending through said disc opening and secured to said diaphragm, the other of said spindle arms, comprising an outer spindle arm, pivoted at its lower end in a point near the disc seating surface with its upper end rigidly secured to said latch arm intermediate its end and disposed near to but inward from said outer latching edge of said latch arm, and biasing means mounted between said disc seat and said one end of said spindle arm.

3. A valve comprising a body having a port therein, said body comprising a seating surface on one side and an abutment on the opposite side of the valve port, a closure pivotally mounted on said seating surface side of said port and comprising a plate having a seating face, an opening therein and a flexible diaphragm mounted on the side of said plate enclosing said opening opposite to said seating face, an arm pivotally secured to the seating face side of said plate, a latching means comprising a latching lever relatively horizontally secured to said arm with its outer end supported as a latch on said abutment when in latched position, a second arm pivotally secured at one end to the inner end of said latching lever and at its other end to said diaphragm, and means, mounted between said plate and said one end of said second arm, biasing said second arm to a position substantially perpendicular to said plate, whereby said closure may be releasably latched in seated position upon said port responsive to differential pressure upon said diaphragm to unseat said closure upon said port.

References Cited in the file of this patent

UNITED STATES PATENTS

| | | |
|---|---|---|
| 1,461,010 | Amdursky | July 3, 1923 |
| 2,166,730 | Schanck | July 18, 1939 |
| 2,213,181 | Wangenheim | Aug. 27, 1940 |
| 2,398,461 | Rider | Apr. 16, 1946 |